Oct. 29, 1957     A. C. ALLEN     2,811,224
AIR LINE OILER
Filed June 24, 1954
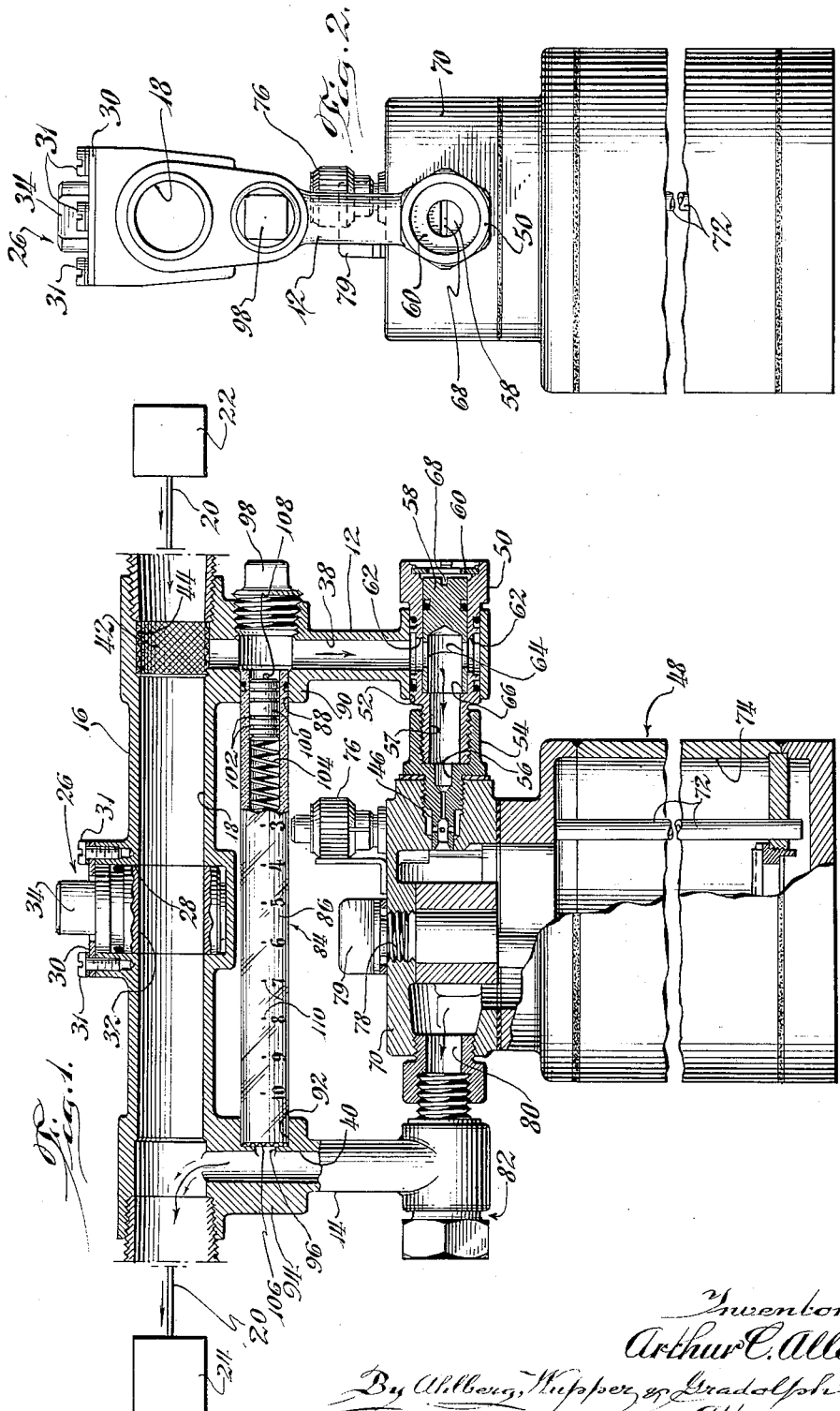

United States Patent Office 2,811,224
Patented Oct. 29, 1957

2,811,224
AIR LINE OILER

Arthur C. Allen, Chicago, Ill., assignor to Stewart-Warner Corporation, Chicago, Ill., a corporation of Virginia Application June 24, 1954, Serial No. 439,099

2 Claims. (Cl. 184—55)

The present invention relates to apparatus for adding lubricating oil to compressed air supply lines for pneumatic tools and the like.

An object of the invention is to provide in an economical practical manner for an improved control of air line oiling apparatus capable of adding to compressed air flowing through a supply line a mist of lubricating oil atomized under pressure in a mist generator operated by air shunted from the air supply line by a differential pressure produced in the apparatus as an incident to the flow of air in the line.

A more specific object is to provide air line oiling apparatus of the character recited in the above object in which the improved control is provided for by incorporation into the apparatus simple and efficient means for accurately indicating the differential air pressure produced and applied to the generator.

Other objects and advantages will become apparent from the following description of the form of the invention shown in the drawings, in which:

Figure 1 is a side view, largely in section, showing a compressed air line oiler embodying the invention and illustrating schematically the connection of the oiler into an air line leading from a source of compressed air to a pneumatic tool; and Fig. 2 is a right end view of the oiler of Fig. 1.

The illustrated embodiment of the invention comprises a casting having two parallel leg portions 12, 14 extending downwardly from opposite ends of a horizontally elongated central section 16. An axial passageway 18 in the central section 16 is internally threaded at opposite ends to be connected in series with an air line 20 extending from a source 22 of air under pressure to a pneumatic tool 24 or the like.

An adjustable flow restriction is formed in the passageway 18 by a plug valve 26 rotatable in a transverse cylindrical receiver 28 in the central portion of the casting section 16. The valve 26 is held in the receiver 28 by a centrally open plate 30 fastened to the upper end of the receiver by screws 31. A cylindrical transverse bore 32 formed in the plug valve 26 may be positioned more or less in alignment with the passageway 18, and has a diameter substantially equal to that of the passageway.

The degree to which the plug valve 26 restricts the air flow through the passageway 18 varies with the angular displacement of the bore 32 from the axis of the passageway as determined by the rotary position of the plug valve. Rotary adjustment of the plug valve 26 is facilitated by a polygonal cross-sectional projection 34 thereon, which extends upwardly through the plate 30.

The right and left leg portions 12, 14 of the casting define internal axial bores 38, 40 which communicate at their upper ends with the passageway 18 on the upstream and downstream sides respectively of the plug valve 26. A cylindrical air strainer 42 is fitted into a counterbore 44 in the right end of the passageway 18 to cover the upper end of the leg bore 38.

The lower end of the bore 38 is connected with an oil atomizing nozzle 46 in a mist generator 48 between the two casting legs 12, 14. This connection is made by a sleeve 50 rotatable in a transverse cylindrical bore 52 formed on the lower end of the leg 12. An elongated element 54 on the generator 48 receives the adjacent threaded end of the sleeve 50 and forms a connecting passageway 56 between an axial bore 57 in the sleeve 50 and the nozzle 46.

The sleeve 50 is counterbored from the end opposite the nozzle 46 to receive a rotatable plug valve 58 held in place by a flat ring 60 swaged in the outer end of the sleeve. Two diametrically opposed radial apertures 62 in the sleeve 50 communicate with the leg bore 38 and are aligned along the axis of the sleeve with two diametrically opposed radial apertures 64 in the plug valve 58. The apertures 64 open into an axial bore 66 in the nozzle end of the plug valve which communicates with the sleeve bore 57 leading to the nozzle 46.

A kerf 68 in the outer end of the plug valve 58 provides for easy rotation of the valve by a screwdriver between an "on" position (as shown in Fig. 1) in which the valve apertures 64 are aligned with the sleeve apertures 62 and an "off" position (not shown) in which the valve apertures are turned out of alignment with the sleeve apertures.

The generator 48 has a sturdy construction capable of safely containing an internal pressure equal to that within the passageway 18 connected to the air line 20. The construction of the generator is similar to that of the oil mist generators shown in U. S. Patent No. 2,610,700, issued to K. E. A. Göthberg September 16, 1952, and in the patent application of Frederick G. Schweisthal, Serial No. 385,745, filed October 13, 1953, and issued January 1, 1957, as Patent No. 2,776,025.

Basically the generator 48 comprises the atomizing nozzle 46 mounted in a head 70 and supplied with oil through a tube 72 connected with an oil reservoir 74 secured to the lower side of the head. The flow of oil sucked into the nozzle 46 by a venturi action is regulated by a suitable valve adjusted by knob structure 76 extending above the head 70. The oil reservoir 74 is filled through an opening 78 in the head 70 closed by a removable plug 79.

A mist outlet 80 in the head 70 is connected to the lower end of the bore 40 in the leg 14 by sleeve and cut off valve structure 82 similar to the previously described structure used to connect the other leg bore 38 with the nozzle inlet passage 56.

A highly efficient air gauge 84 of simple construction is connected between the casting leg bores 38, 40 to indicate the differential pressure applied between the inlet 56 and the outlet 80 of the generator 48. Structurally, the air gauge comprises a straight tube 86 of transparent glass or plastic inserted through a transverse bore 88 in an enlarged section 90 of the leg 12 adjacent the passageway 18 and extending into a counterbore 92 in a similar enlarged section 94 of the leg 14. The right end of the tube 86 communicates directly with the leg bore 38 and the left end of the tube communicates with the other leg bore 40 through a small bore 96 at the bottom of the counterbore 92. The outer end of the transverse leg bore 88, through which the tube is inserted, is closed by a plug 98.

A piston 100 scored by a series of annular grooves 102 is slidable in the tube 86 forming a close fit with the tube. A calibrated compression spring 104 interposed between a perforated disc 106 at the bottom of the counterbore 92 and the piston 100 urges the piston toward a transverse stop pin 108 in the end of the tube adjacent the leg bore 38.

A suitable scale 110 on the tube 86 is graduated in pounds per square inch starting from the right end of the tube, Fig. 1, to provide readings of the position of the piston 100 in terms of the differential pressure between opposite ends of the tube.

The improved air line oiler thus formed is extremely flexible and efficient in operation. The oil reservoir 74 in the mist generator 48 can be filled without interrupting the air flow through the passageway 18 connected in series with the compressed air line 20. Before removing the filling plug 79, the valves 58 and 82 at the inlet and outlet of the generator 48 are closed. After filling the reservoir 74 through the opening 78, the plug 79 is replaced and the valves 58 and 82 opened to bypass air through the generator 48 as an incident to the flow of air through the passageway 18.

Oils of widely varying viscosities can be efficiently atomized in the generator by regulating the differential air pressure produced in the passageway 18 and applied to the generator as an incident to the flow of compressed air through the passageway. Regulation of the differential air pressure requires only a simple adjustment of the plug valve 26 to vary the effective resistance of this member to air flow in the passageway 18. The actual value of the differential air pressure applied to the generator 48 is indicated by the position of the air gauge piston 100 along the scale 110.

Ordinarily the differential pressure of the air shunted through the generator 48 is only a small fraction of the pressure within the passageway 18. As an example, the pressure within the passageway 18 may be of the order of 100 pounds per square inch gauge while the differential pressure used in operating the generator may be only five pounds per square inch.

With the plug valve 26 adjusted to provide the optimum differential operating pressure for the generator 48 considering the viscosity of the oil and the rate at which the mist is to be produced, the oil richness of the mist is adjusted by turning the oil flow control knob 76.

The apparatus thus provided operates without further attention from the operator to add to the air flowing through the line 20 the proper quantity of highly atomized lubricating oil for efficient lubrication of the pneumatic tool 24 and other pneumatic implements and devices that may be connected to the line, operating only while air for the operation of the tool is flowing through passageway 18.

While I have shown and described a preferred embodiment of my invention, it will be apparent that variations and modifications thereof may be made without departing from the principles and scope of the invention. I therefore desire, by the following claims, to include all such variations and modifications by which substantially the results of my invention may be obtained through the use of substantially the same or equivalent means.

I claim:

1. Apparatus for adding a mist of finely divided oil particles at a controlled rate to compressed air flowing through a supply line and comprising, in combination, means defining a passageway adapted to be connected in a compressed air supply line, means forming an adjustable flow restriction in the passageway, an oil mist generator having at least one mist generating nozzle therein, a compressed air inlet on the generator connected to communicate with the passageway at the upstream side of the flow restriction means, an oil mist outlet on the generator connected to communicate with the passageway on the downstream side of the flow restriction means so that the generator is operated by the differential pressure across the flow restriction means, a transparent cylinder connected at opposite ends with the passageway at opposite sides of the flow restriction means, and means including a piston slidable in the cylinder and a spring urging the piston toward the high pressure end of the cylinder for indicating the differential pressure applied to the generator.

2. Apparatus connectable with an air supply line to atomize oil and add an aerosol of the atomized oil particles to the air flow through the line, comprising, in combination, means forming a passageway adapted at opposite ends to be connected to an air supply line to form a part thereof, means forming a flow restriction in the passageway to create a differential pressure therein as an incident to the flow of air therethrough, an oil mist generator having an air inlet and a mist outlet, means for connecting the generator air inlet with the passageway at the upstream side of the flow restriction therein, means for connecting the generator mist outlet with the passageway at the downstream side of the flow restriction therein, and an at least partially transparent cylinder having opposite ends communicating with the air inlet of the generator and the mist outlet therefrom, a piston slidable in the cylinder, a spring urging the piston toward the generator inlet end of the cylinder, and a graduated scale for indicating the position of the piston in terms of air pressure or the like.

References Cited in the file of this patent

UNITED STATES PATENTS

| | | |
|---|---|---|
| 1,620,253 | Gates | Mar. 8, 1927 |
| 2,681,710 | Streicker et al. | June 22, 1954 |
| 2,684,593 | Rothstein | July 27, 1954 |
| 2,698,064 | Streicker et al. | Dec. 28, 1954 |
| 2,698,065 | Streicker et al. | Dec. 28, 1954 |